US008699849B2

(12) United States Patent
Strub

(10) Patent No.: US 8,699,849 B2
(45) Date of Patent: Apr. 15, 2014

(54) SYSTEMS, METHODS, AND APPARATUS FOR RECORDING MULTI-DIMENSIONAL AUDIO

(75) Inventor: Tyner Brentz Strub, Bonita Springs, FL (US)

(73) Assignee: Strubwerks LLC, Bonita Springs, FL (US)

( * ) Notice: Subject to any disclaimer, the term of this patent is extended or adjusted under 35 U.S.C. 154(b) by 492 days.

(21) Appl. No.: 12/759,375

(22) Filed: Apr. 13, 2010

(65) Prior Publication Data

US 2010/0260483 A1 Oct. 14, 2010

Related U.S. Application Data

(60) Provisional application No. 61/169,044, filed on Apr. 14, 2009.

(51) Int. Cl.
*H04N 9/80* (2006.01)

(52) U.S. Cl.
USPC ................................ 386/239; 348/46; 381/26

(58) Field of Classification Search
USPC .......... 386/239, 326, E5.001; 348/46; 381/26
See application file for complete search history.

(56) References Cited

U.S. PATENT DOCUMENTS 5,438,623 A 8/1995 Begault
5,500,900 A 3/1996 Chen et al.
5,625,408 A * 4/1997 Matsugu et al. ................ 348/42
5,809,149 A 9/1998 Cashion et al.
5,862,229 A 1/1999 Shimizu
6,421,446 B1 7/2002 Cashion et al.
6,829,017 B2 12/2004 Phillips
6,829,018 B2 12/2004 Lin et al.
6,990,205 B1 1/2006 Chen
7,327,848 B2 2/2008 Squibbs
7,492,907 B2 2/2009 Klayman et al.
8,165,326 B2 4/2012 Ohashi
2003/0007648 A1 1/2003 Currell
2003/0031333 A1 2/2003 Cohen et al.
2003/0053634 A1 * 3/2003 McGrath et al. ................ 381/26
2006/0045294 A1 3/2006 Smyth et al.

(Continued)

FOREIGN PATENT DOCUMENTS

JP 6105400 A 4/1994

OTHER PUBLICATIONS

Ge, S.S. et al., "3D Sound Localization Based on Audio and Video," The Fourth International Conference on Control and Automation (ICCA'03), Jun. 10-12, 2003, Montreal, Canada, pp. 168-172.

(Continued)

*Primary Examiner* — Thai Tran
*Assistant Examiner* — Girumsew Wendmagegn
(74) *Attorney, Agent, or Firm* — Sutherland Asbill & Brennan LLP

(57) ABSTRACT

Certain embodiments of the invention may include systems, methods, and apparatus for recording three dimensional audio. According to an example embodiment of the invention, the method may include orienting a three-dimensional (3-D) microphone with respect to a predetermined spatial direction, selectively receiving sounds from one or more directions corresponding to directional receiving elements, recording the selectively received sounds in a 3-D recorder having a plurality of recording channels, recording time code in at least one channel of the 3-D recorder; and mapping the recorded channels to a plurality of output channels.

20 Claims, 14 Drawing Sheets

(56) References Cited

U.S. PATENT DOCUMENTS

| | | | | |
|---|---|---|---|---|
| 2006/0098827 | A1 | 5/2006 | Paddock et al. | |
| 2007/0165868 | A1 | 7/2007 | Klayman et al. | |
| 2007/0297626 | A1* | 12/2007 | Revit et al. | 381/307 |
| 2008/0069378 | A1 | 3/2008 | Rabinowitz et al. | |
| 2009/0028347 | A1 | 1/2009 | Duraiswami et al. | |
| 2009/0034764 | A1* | 2/2009 | Ohashi | 381/307 |
| 2009/0041254 | A1 | 2/2009 | Jin et al. | |
| 2009/0046864 | A1 | 2/2009 | Mahabub et al. | |
| 2009/0092259 | A1 | 4/2009 | Jot et al. | |
| 2010/0098258 | A1* | 4/2010 | Thorn | 381/1 |

OTHER PUBLICATIONS

Non-Final Office Action for U.S. Appl. No. 12/759,366 mailed Mar. 14, 2012.

Applicant response to Non-Final Office Action for U.S. Appl. No. 12/759,366 mailed Mar. 14, 2012.

Final Office Action for U.S. Appl. No. 12/759,366 mailed Sep. 11, 2012.

Applicant response to Final Office Action for U.S. Appl. No. 12/759,366 mailed Sep. 11, 2012.

Notice of Allowance for U.S. Appl. No. 12/759,366 mailed Mar. 13, 2013.

Non-Final Office Action for U.S. Appl. No. 12/759,351 mailed Nov. 20, 2012.

Applicant response to Non-Final Office Action for U.S. Appl. No. 12/759,351 mailed Nov. 20, 2012.

Final Office Action for U.S. Appl. No. 12/759,351 mailed May 6, 2013.

Applicant response to Final Office Action for U.S. Appl. No. 12/759,351 mailed May 6, 2013.

* cited by examiner

| spkrs/map | Left | Right | L. Surr. | R. Surr. | Top Front | Top Rear |
|---|---|---|---|---|---|---|
| 1 | + | 0 | 0 | 0 | + | 0 |
| 2 | + | + | - | - | + | 0 |
| 3 | 0 | + | - | 0 | + | 0 |
| 4 | + | - | + | - | + | + |
| 5 | 0 | 0 | 0 | 0 | + | + |
| 6 | - | + | - | + | + | + |
| 7 | 0 | - | + | 0 | 0 | + |
| 8 | - | - | + | + | - | + |
| 9 | - | 0 | 0 | + | 0 | + |
| 10 | + | 0 | 0 | - | 0 | - |
| 11 | + | + | - | - | 0 | 0 |
| 12 | 0 | + | - | 0 | 0 | - |
| 13 | + | - | + | - | 0 | 0 |
| 14 | 0 | 0 | 0 | 0 | 0 | 0 |
| 15 | - | + | - | + | 0 | 0 |
| 16 | 0 | - | + | 0 | - | 0 |
| 17 | - | - | + | + | 0 | 0 |
| 18 | - | 0 | 0 | + | - | 0 |
| 19 | + | 0 | 0 | - | - | off |
| 20 | + | + | - | - | 0 | - |
| 21 | 0 | + | - | 0 | - | off |
| 22 | + | - | + | - | - | - |
| 23 | 0 | 0 | 0 | 0 | - | - |
| 24 | - | + | - | + | - | - |
| 25 | 0 | - | + | 0 | off | - |
| 26 | - | - | + | + | - | 0 |
| 27 | - | 0 | 0 | + | off | - |

FIG. 7

SYSTEMS, METHODS, AND APPARATUS FOR RECORDING MULTI-DIMENSIONAL AUDIO

CROSS-REFERENCE TO RELATED APPLICATION

This application claims benefit of U.S. Provisional Application No. 61/169,044, filed Apr. 14, 2009, which is incorporated herein by reference in its entirety.

RELATED APPLICATIONS

This application is related to application Ser. No. 12/759,366, filed concurrently with the present application on Apr. 13, 2010, entitled: "Systems, Methods, and Apparatus for Controlling Sounds in a Three-Dimensional Listening Environment," the contents of which are hereby incorporated by reference in their entirety.

This application is also related to application Ser. No. 12/759,351, filed concurrently with the present application on Apr. 13, 2010, entitled: "Systems, Methods, and Apparatus for Calibrating Speakers for Three-Dimensional Acoustical Reproduction," the contents of which are hereby incorporated by reference in their entirety.

FIELD OF THE INVENTION

The invention generally relates to sound audio processing, and more particularly, to systems, methods, and apparatus for recording multi-dimensional audio.

BACKGROUND OF THE INVENTION

The terms "multi-channel audio" or "surround sound" generally refer to systems that can produce sounds that appear to originate from multiple directions around a listener. With the recent proliferation of computer games and game consoles, such as the Microsoft® X-Box®, the PlayStation®3 and the various Nintendo®-type systems, combined with at least one game designer's goal of "complete immersion" in the game, there exists a need for audio systems and methods that can assist the "immersion" by encoding three dimensional (3-D) spatial information in a multi-channel audio recording. The conventional and commercially available systems and techniques including Dolby Digital, DTS, and Sony Dynamic Digital Sound (SDDS) may be used to reproduce sound in the horizontal plane (azimuth), but such conventional systems may not adequately reproduce sound effects in elevation to recreate the experience of sounds coming from overhead or under-foot. Therefore, a need exists for systems and methods to record multi-dimensional audio, decode, process and accurately reproduce 3-D sounds for a listening environment and for use with gaming consoles or other sources of visual information.

SUMMARY OF THE INVENTION

Embodiments of the invention can address some or all of the needs described above. According to embodiments of the invention, disclosed are systems, methods, and apparatus for recording multi-dimensional audio. According to an example embodiment of the invention, the method may include orienting a three-dimensional (3-D) microphone with respect to a predetermined spatial direction, selectively receiving sounds from one or more directions corresponding to directional receiving elements, recording the selectively received sounds in a 3-D recorder having a plurality of recording channels, recording time code in at least one channel of the 3-D recorder, and mapping the recorded channels to a plurality of output channels.

According to an example embodiment of the invention, a system is provided for recording multi-dimensional audio and video. The system includes at least one video camera, a three-dimensional (3-D) microphone including a plurality of directional receiving elements, the 3-D microphone oriented with respect to a predetermined spatial direction associated with the video camera. The system also includes a 3-D recorder configured to selectively receive sound information from the 3-D microphone, and further configured to record the selectively received sound information in channels corresponding to the plurality of directional receiving elements, record time code, and map the recorded channels to a plurality of output channels.

According to an example embodiment of the invention, an apparatus is provided for recording multi-dimensional audio. The apparatus includes a three-dimensional (3-D) microphone comprising a plurality of directional receiving elements, where the 3-D microphone is oriented with respect to a predetermined spatial direction. The apparatus also includes a 3-D recorder configured to selectively receive sound information from the 3-D microphone, and further configured to record the selectively received sound information in channels corresponding to the plurality of directional receiving elements, record time code, and map the recorded channels to a plurality of output channels.

Other embodiments and aspects of the invention are described in detail herein and are considered a part of the claimed invention. Other embodiments and aspects can be understood with reference to the following detailed description, accompanying drawings, and claims.

BRIEF DESCRIPTION OF THE DRAWINGS

Reference will now be made to the accompanying tables and drawings, which are not necessarily drawn to scale, and wherein:

FIG. 7 illustrates an example look-up table of relative speaker volume levels for placement of sound at the 3D-EA localization regions of FIG. 6, in accordance with an example embodiment of the invention.

DETAILED DESCRIPTION OF EMBODIMENTS

Embodiments of the invention will now be described more fully hereinafter with reference to the accompanying drawings. This invention may, however, be embodied in many different forms and should not be construed as limited to the embodiments set forth herein; rather, these embodiments are provided so that this disclosure will be thorough and complete, and will convey the scope of the invention.

Figure 1:
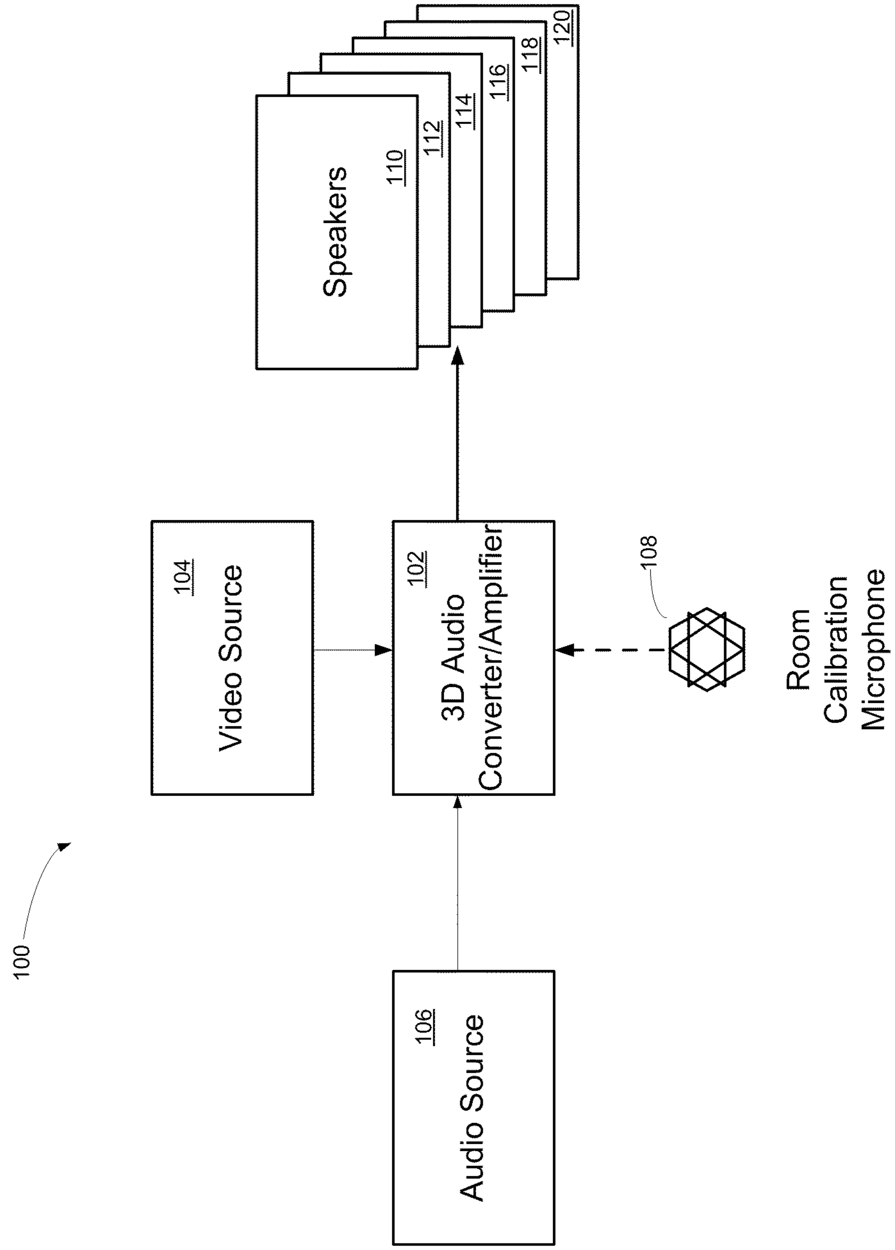
FIG. 1 depicts an example system block diagram, in accordance with an example embodiment of invention.

FIG. 1 depicts an example system 100, in accordance with an example embodiment of invention. The 3-D audio converter/amplifier 102 can accept and process audio from an external audio source 106, which may include, for example, the audio output from a gaming console, the stereo audio from a standard CD player, tape deck, or other hi-fi stereo source, a mono audio source, or a digitized multi-channel source, such as Dolby 5.1 surround sound from a DVD player, or the like. The 3-D audio converter/amplifier 102 may also accept and process video from an external video source 104, such as a gaming console, a DVD player, a video camera, or any source providing video information. The audio source 106 and video source 104 may be connected to separate input ports of the 3-D audio converter/amplifier 102, or the audio source 106 and video source 104 may be combined through one cable, such as HDMI, and the audio and video may be separated within the 3-D audio converter/amplifier 102 for further processing.

According to an example embodiment of the invention, the 3-D audio converter/amplifier 102 may provide both input and output jacks, for example, to allow video to pass through for a convenient hook-up to a display screen. Detailed embodiments of the 3-D audio converter/amplifier 102 will be explained below in reference to FIG. 5, but in general, the 3-D audio converter/amplifier 102 may provide processing, routing, splitting, filtering, converting, compressing, limiting, amplifying, attenuating, delaying, panning, phasing, mixing, sending, bypassing, etc., to produce or re-produce 3D-EA sounds in a listening environment in both a horizontal plane (azimuth) and vertical plane (height) around the listener. According to an example embodiment, the 3-D audio converter/amplifier 102 may include an input for a video source 104. The video source 104 may be analyzed by the 3-D audio converter/amplifier 102, either in real-time or near-real time, to extract spatial information that may be encoded or otherwise used for setting the parameters of the signals that may be sent to the speakers 110-120, or to other external gear for further processing. In an example embodiment of the invention, the 3D-EA sound localization, or apparent directionality of the sonic information may be encoded and/or produced in relation to the position of objects within the 2-dimensional plane of a video image. Furthermore, according to an example embodiment of the invention, the 3D-EA sound localization may be automatically generated based at least in part on the processing and analysis of the video information, which may include relative depth information as well as information related to the position of objects within the 2-dimensional plane of the video image. According to an example embodiment, the system 100 may detect movement of an object in a video on the upper left side of the screen, and may shift the localization of the 3D-EA sound to the appropriate speakers to give the impression that the audio is coming from the upper left corner of the room, for example. According to other embodiments of the invention, object position information (provided either by automatic analysis of the video signal, or by object positional information encoded into the audio and relating to the video information) can be processed by the 3-D audio converter/amplifier 102 for dynamic positioning and/or placement of multiple 3D-EA sounds within a listening environment and optionally correlated with the positioning and/or placement of multiple objects in an associated video.

According to an example embodiment of the invention, a speaker array, including speakers 110-120, may be in communication with the 3-D audio converter/amplifier 102, and may be responsive to the signals produced by the 3-D audio converter/amplifier 102. In one embodiment, the system 100 may also include a room calibration microphone 108, as depicted in FIG. 1. According to an example embodiment, the room calibration microphone 108 may contain one or more diaphragms for detecting sound simultaneously from one or more directions. The room calibration microphone 108 may be responsive to the time-varying sound pressure level signals produced by the speakers 110-120, and may provide calibration input to the 3-D audio converter/amplifier 102 for proper setup of the various parameters (processing, routing, splitting, equalization, filtering, converting, compressing, limiting, amplifying, attenuating, delaying, panning, mixing, sending, bypassing, for example) within the 3-D audio converter/amplifier 102 to calibrate the system 100 for a particular room. The room calibration microphone 108 may also be utilized in combination with a calibration tone generator within the 3-D audio converter/amplifier 102, and speakers 110-120 appropriately placed in the listening environment, to automatically calibrate the system 100. The details of this calibration procedure, in accordance with example embodiments of the invention, will be discussed in the ROOM AND SPEAKER SETUP/CALIBRATION METHOD section below.

Figure 2:
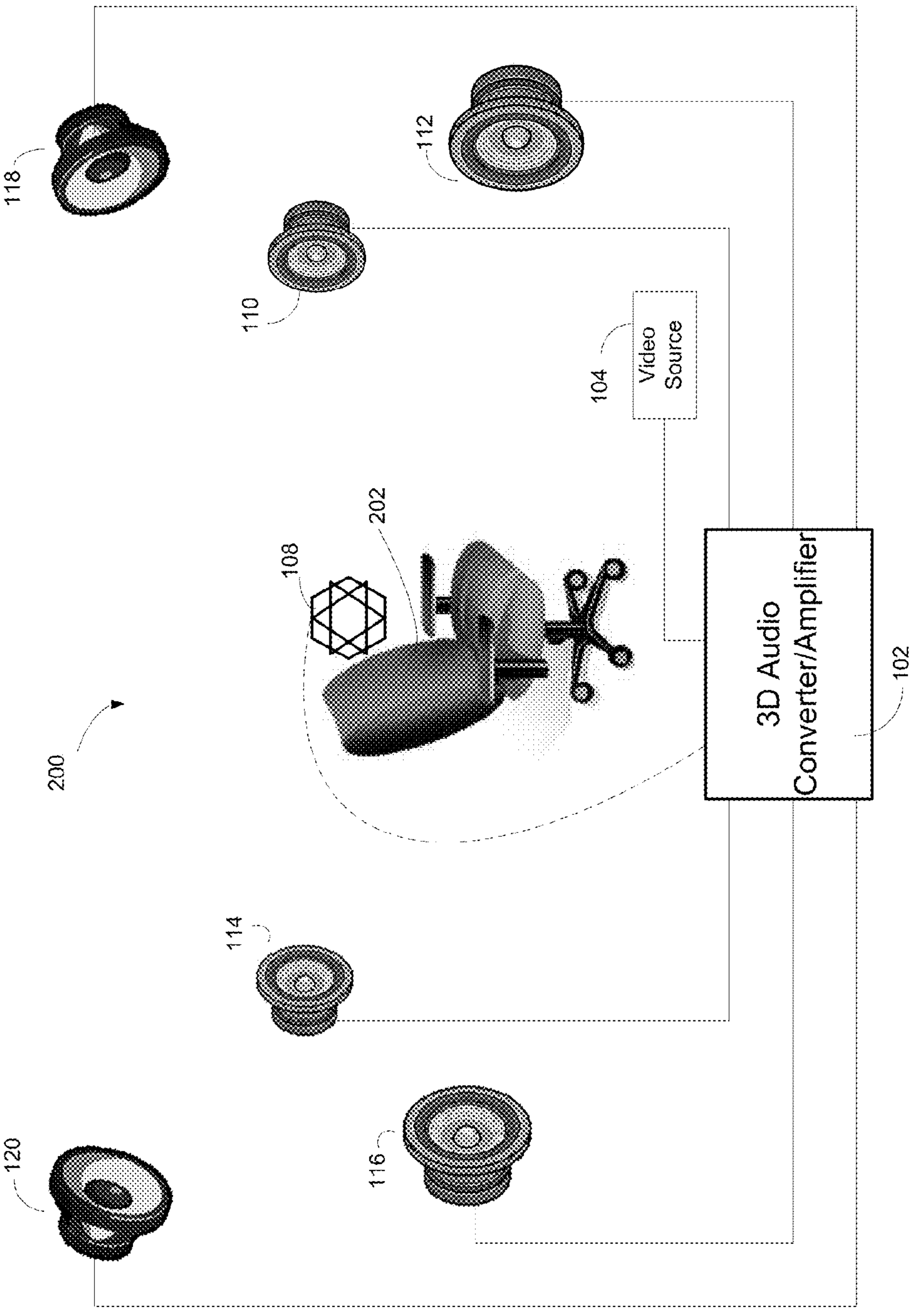
FIG. 2 illustrates an example speaker perspective arrangement for a system, in accordance with an example embodiment of the invention.

FIG. 2 illustrates an example speaker perspective arrangement for an example listening environment 200 for a 3D-EA system in accordance with an embodiment of the invention. According to an example embodiment, the speakers, in communication with the 3-D audio converter/amplifier 102, can be designated as Left 110, Right 112, Left Surround 114, Right Surround 116, Top Center Front 118, and Top Center Rear 120. According to other example embodiments, the number and physical layout of speakers can vary within the environment 200, and may also include a subwoofer (not shown). In accordance with an example embodiment of the invention, the Left 110, Right 112, Left Surround 114, Right Surround 116 speakers can be placed at ear level with respect to the listener position 202. In accordance with another example embodiment of the invention, the Left 110, Right 112, Left Surround 114, Right Surround 116 speakers can be placed below ear level with respect to the listener position 202 to further extend the region of placement of 3D-EA sounds so that they appear to come from below the listener. In one example, an approximate equilateral triangle can be formed between the Left 110 speaker, the Right 112 speaker, and the listener position 202. In another example, the Left 110 and Right 112 speakers can be oriented such that an acute angle of the isosceles triangle formed between the speakers 110, 112 and the listener position 202 is between approximately 40 and approximately 60 degrees.

FIG. 2 also illustrates a Top Center Front 118 speaker and a Top Center Rear 120 speaker in accordance with an embodiment of the invention. These speakers 118, 120 can, respectively, be placed at the front and rear of the listening environment 200, vertically elevated above the listener position 202, and can be angled downwards by approximately 10 to approximately 65 degrees to direct sound downwards towards the listener(s). The Top Center Front 118 speaker can be placed in the front of the environment 200 or room, typically above a viewing screen (not shown), and the Top Center Rear 120 speaker can be placed behind and above the listener position 202. In this embodiment, the Top Center Rear 120 and Top Center Front 118 speakers may be pointed downwards at an angle towards the listener at listener position 202 so that the actual sonic reflections vibrate selective regions of cartilage within the ears of the listener to engage vertical or azimuth directional perception. According to an example embodiment of the invention, one or more of the speakers may be connected directly to the 3-D audio converter/amplifier 102 using two conductor speaker wires. According to another example embodiment of the invention, one or more of the speakers may be connected wirelessly to the 3-D audio converter/amplifier 102.

Also depicted in FIG. 2 is the room calibration microphone 108. As will be discussed further in the ROOM AND SPEAKER SETUP/CALIBRATION METHOD section below, the room calibration microphone 108 may be wired or wireless, and may be in communication with the 3-D audio converter/amplifier 102. According to an example embodiment, the room calibration microphone 108, in cooperation with the 3-D audio converter/amplifier 102, and speakers 110-120 may be utilized for any of the following: (a) to calibrate the speakers 110-120 for a particular room or listening environment 200, (b) to aid in the setup and placement of the individual speakers for optimum 3D-EA performance, (c) to set up the equalization parameters for the individual channels and speakers, and/or (d) to utilize feedback to set the various parameters, speaker placements, etc.

Figure 3:
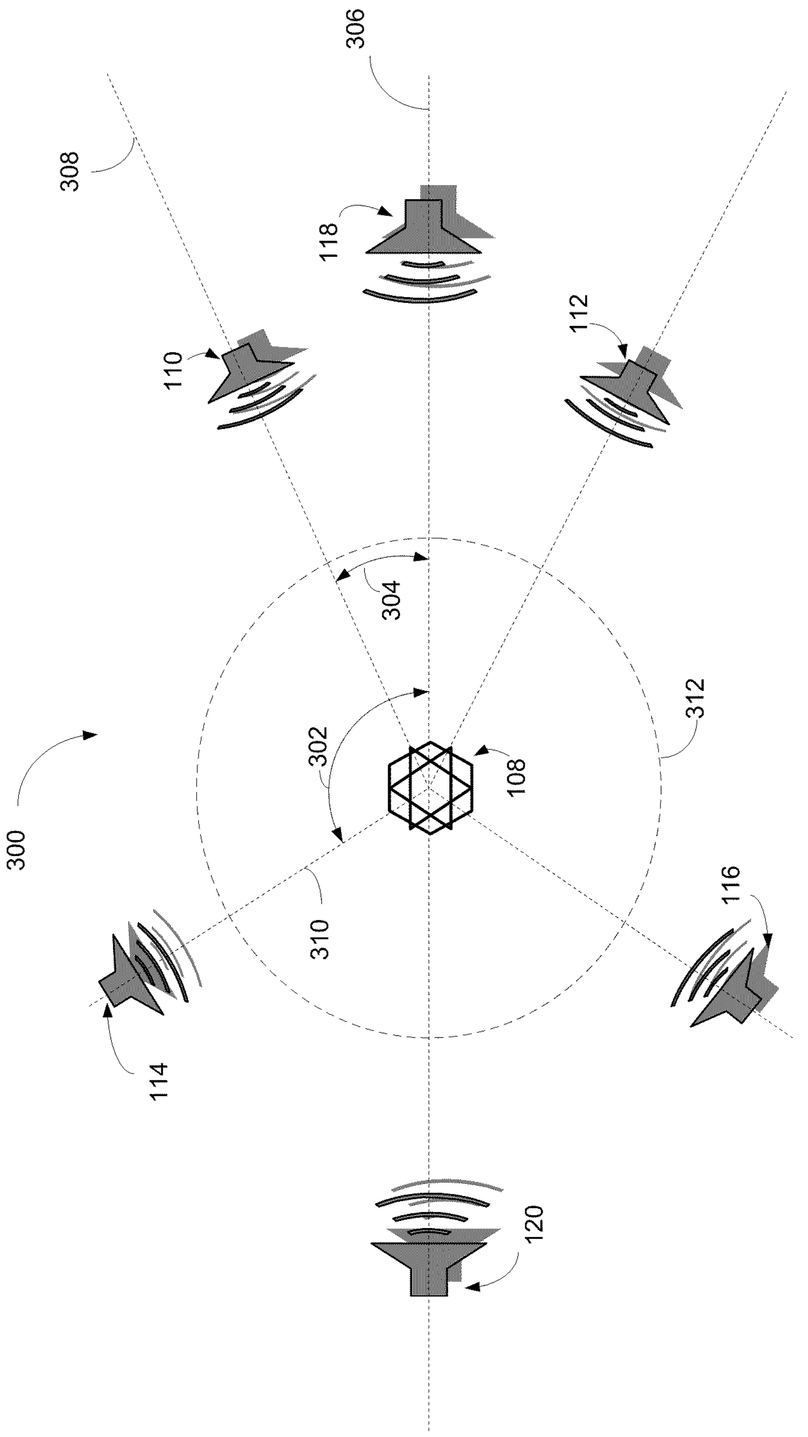
FIG. 3 illustrates an example speaker placement top-down view, in accordance with an embodiment of the invention.

FIG. 3 shows a top-down view of an example 3D-EA listening environment 300, in accordance with an example embodiment of the invention. As measured with respect to the center line 306 bisecting the Top Center Front 118 and Top Center Rear 120 speakers, the Left 110 speaker may be centered on line 308 extending from the position of the listener to form an angle 304 with the center line 306 of approximately 30 degrees. Depending on the room configuration and other factors related to the optimum 3D-EA sound, the angle 304 may range between about 10 and about 80 degrees. Similarly, the Left Surround 114 speaker may be centered on line 310 extending from the position of the listener to form an angle 302 with the center line 306 of approximately 110 degrees. Depending on the room configuration and other physical limitations or factors related to the optimum 3D-EA sound, the angle 304 may range between about 100 and about 160 degrees. The Right 112 and Right Surround 116 speakers may be placed in a mirror image with respect to the centerline 306 respectively with the Left 110 and Left Surround 114 speakers. As depicted in FIGS. 2 and 3, the Top Center Front 118 and Top Center Rear 120 speakers may be placed on the centerline (as their names suggest) and, as with the other speakers, may be pointed to direct 3D-EA sound towards the listener. According to example embodiments of the invention, the linear distance between the listener at listening position 202 (FIG. 2), as depicted by the position of the room calibration microphone 108 (FIG. 3), and the individual speakers 110-120 may vary, and may depend on the room configuration, room physical limitations, factors related to the optimum 3D-EA sound, and the size of the 3D-EA listening sphere or dome 312 needed in order to reproduce 3D-EA sounds for one or more listeners. Typically, a 3D-EA listening sphere or dome 312 will have a radius smaller than the distance to the closest speaker 110-120. However, according to an example embodiment of the invention, the size of the 3-D listening sphere or dome 312 may be expanded or contracted by selective processing, routing, volume control, and/or phase control of the driving energy directed to each of speakers 110-120.

Figure 4:
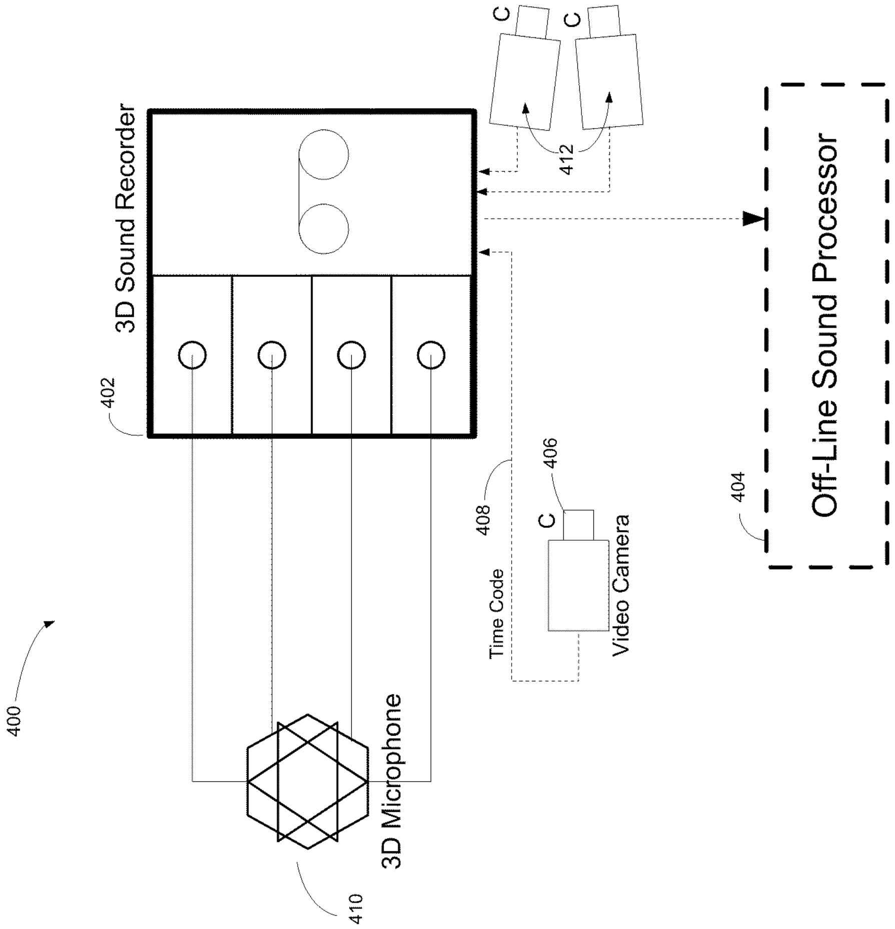
FIG. 4 illustrates an example 3D-EA system for recording 3-D audio, in accordance with an example embodiment of the invention.

FIG. 4 depicts an example 3D-EA recording system 400, according to an embodiment of the invention. The system 400 may be utilized to record and/or otherwise encode 3-D audio information from the source environment. According to an example embodiment, the 3D-EA recording system 400 may encode the naturally occurring directional information within a particular scene or environment to help minimize the manual processing of 3D-EA sounds that may otherwise be done during post production. According to an example embodiment, a binaural microphone system (not shown) may be utilized for recording audio. A typical binaural recording unit has two high-fidelity microphones mounted in a dummy head, and the microphones are inserted into ear-shaped molds to fully capture some or all of the audio frequency adjustments that can occur naturally as sound wraps around the human head and is shaped by the form of the outer and inner ear. According to another example embodiment, a 3-D microphone 410, which may be similar to the room calibration microphone 108 described above, may be utilized to selectively record sounds from multiple directions. According to an example embodiment, the 3-D microphone 410 may have at least one diaphragm element per spatial dimension of directional sensitivity and encoding. The signals produced by the 3-D microphone 410 may be received and recorded via a 3-D sound recorder 402 having multiple input and storage channels. According to an example embodiment of the invention, the 3-D sound recorder 402 may simultaneously record time code 408 that is provided by a video camera 406. According to an example embodiment of the invention, the 3-D sound recorder 402 may simultaneously record time code 408 that is provided by a time-code generator within the 3-D sound recorder 402. After recording the audio and time code, the information may be downloaded or otherwise transferred to an off-line sound processor 404 for further processing or storage. According to example embodiments of the invention, the audio and time code information may be further edited and processed for use with a video, an audio recording, or a computer game, for example.

Figure 5:
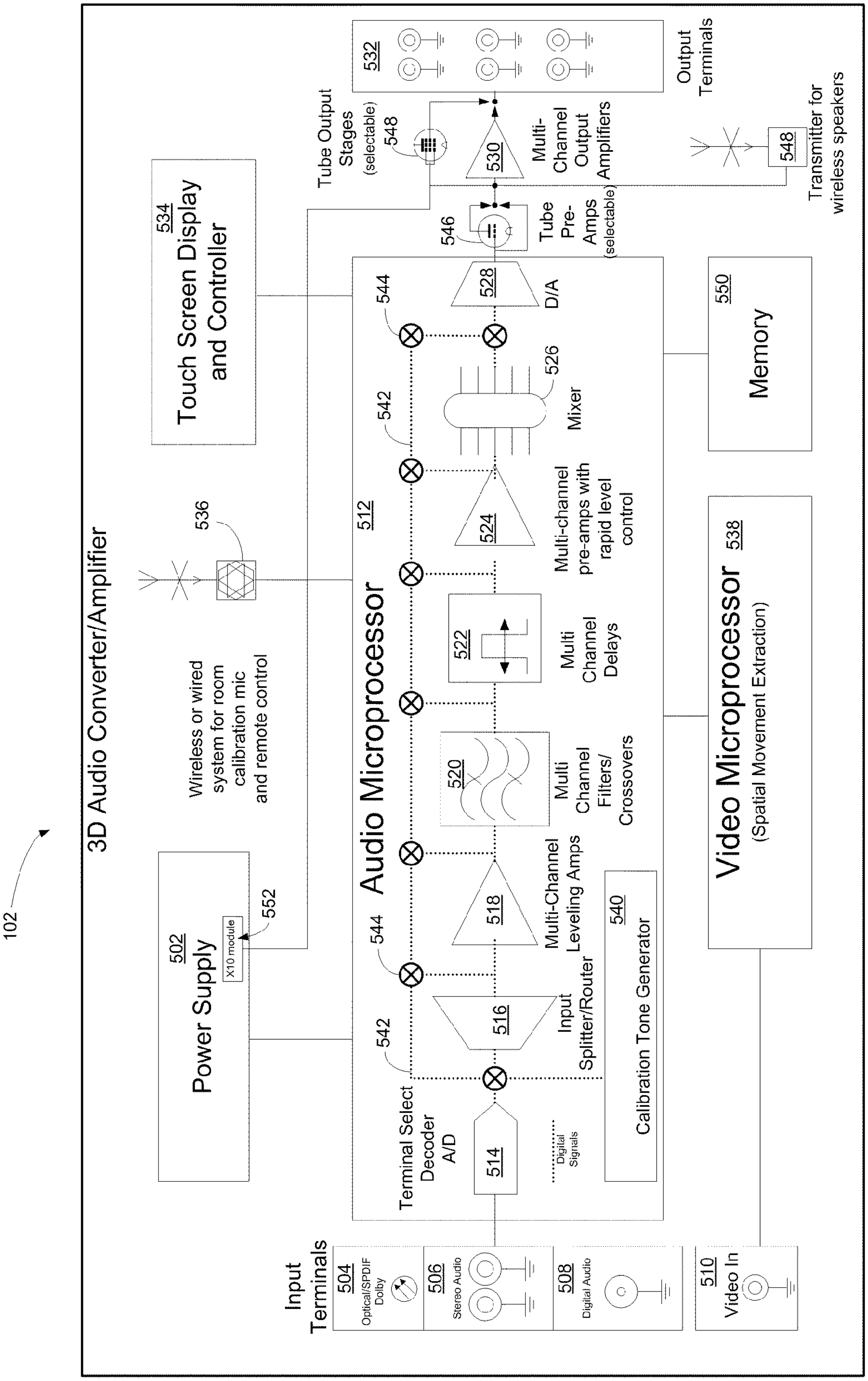
FIG. 5 illustrates an example system for converting, routing, and processing audio and video, in accordance with an example embodiment of the invention.

FIG. 5 depicts a block diagram representation of the 3-D audio converter/amplifier, according to an example embodiment of the invention. Input terminals 504-510 can be utilized for receiving one or more input audio and/or video signal sources, including pre-processed 3D-EA. The input terminals 504-510 may include multiple input terminals (not shown) to facilitate a variety of source connections including, but not limited to, RCA, XLR, S/PDIF, digital audio, coaxial, optical, ¼" stereo or mono, ⅛" mini stereo or mono, DIN, HDMI and other types of standard connections. According to an example embodiment, the audio input terminals 504, 506, 508 may be in communication with an audio microprocessor 512, and the video input terminal 510 may be in communication with a video microprocessor 538. Each of the microprocessors 512, 538 may be in communication with a memory device 550 and may either reside on the same or different integrated circuits.

According to an example embodiment of the invention, the audio microprocessor 512 may include a terminal select decoder A/D module 514, which may receive signals from the input terminals 504-508. The decoder 514 may be in communication with an input splitter/router 516, which may be in communication with multi-channel leveling amplifiers 518. The multi-channel leveling amplifiers 518 may be in communication with multi-channel filters/crossovers 520 which may be in communication with a multi-channel delay module 522. The multi-channel delay module 522 may be in communication with multi-channel pre-amps 524, which may be in communication with a multi-channel mixer 526, which may be in communication with an output D/A converter 528. The output of the audio microprocessor 512 may be in communication with multiple and selectable tube pre-amps 546. The output from either the D/A converter 528, or the tube pre-amps 546, or a mix of both, may be in communication with multi-channel output amplifiers 530, multiple tube output stages 548, and a transmitter 548 for the wireless speakers. The output of the tube output stages 548 and/or the multi-channel output amplifiers 530, or a mix of both, may be in communication with output terminals 532, which are further in communication with speakers. According to an example embodiment, the transmitter 548 for the wireless speakers may be in communication with a receiver associated with the wireless speaker (not shown). According to an example embodiment, a routing bus 542 and summing/mixing/routing nodes 544 may be utilized to route and connect all digital signals to and from any of the modules described above within the audio microprocessor 512.

The 3-D audio converter/amplifier 102 may also include a touch screen display and controller 534 in communication with the audio microprocessor 512 for controlling and displaying the various system settings. According to an example embodiment, the 3-D audio converter/amplifier 102 may include a wireless system for communication with the room calibration microphone 108 and a wireless remote control. A power supply 502 may provide power to all the circuits of the 3-D audio converter/amplifier 102.

According to an example embodiment, the 3-D audio converter/amplifier 102 may include one or more input terminals 510 for video information. For example, one terminal may be dedicated to video information, while another is dedicated to video time code. The video input terminals 510 may be in communication with a video microprocessor 538 for spatial movement extraction. The video microprocessor 538 may be in further communication with the audio microprocessor 512, and may provide spatial information for selectively processing the temporal audio information.

Again with reference to FIG. 5, blocks of the audio microprocessor 512 within the 3-D audio converter/amplifier 102 will now be explained, according to example embodiments of the invention. The input terminal select decoder A/D module 514 may selectively receive and transform the one or more input audio signals from the input terminals 504-508 (or from other input terminals not shown) as needed. According to an example embodiment, if information is present at the Optical/SPDIF terminal 504 in the form of a digital optical signal, the decoder 514 may detect the presence of the optical signal, and may perform the appropriate switching and optical to electrical conversion. According to example embodiments of the invention, the decoder 514 may automatically select input terminals via a signal detection process, or it may require manual input by the user, particularly in the case where multiple input signals may be present, and when one particular input is desired. According to example embodiments of the invention, the terminal select decoder A/D module 514 may include additional sub-modules for performing terminal sensing, terminal switching, transformations between optical and electrical signals, sensing the format of the digital or analog signal, and performing transformations from analog to digital signals. According to an example embodiment, analog audio signals may be converted to digital signals via an A/D converter within the terminal select decoder A/D module 514, and as such, may remain in digital format until converted back to analog at the D/A converter 528 prior to being amplified and sent to the speakers. Conversely, digital signals present on the input terminals may bypass the A/D submodule processing since they are already in the digital format. The signal flow in FIG. 5 indicates digital signals as dashed lines, according to an example embodiment of the invention However, according to other example embodiments of the invention, input signals (analog or digital) may be routed to bypass one or more of the modules 516-528, and yet in other embodiments of the invention, one or more of the modules 514-528 may include the capability to process either digital or analog information.

With continued reference to FIG. 5, and according to an example embodiment of the invention, a multi-signal bus 542 with multiple summing/mixing/routing nodes 544 may be utilized for routing, directing, summing, and mixing signals to and from any of the modules 514-528, and/or the calibration tone generator 540. According to an example embodiment, the input splitter/router module 516 may receive digital signals from the decoder 514, and may act as an input mixer/router for audio signals, either alone, or in combination with the bus 542 and the summing/mixing/routing nodes 544. The input splitter/router module 516 may also receive a signal from the calibration tone generator 540 for proper routing through the rest of the system. According to an example embodiment of the invention, the input splitter/router module 516 may perform the initial audio bus 542 input routings for the audio microprocessor 512, and as such, may be in parallel communication with the downstream modules, which will be briefly described next.

According to an example embodiment of the invention, the audio microprocessor 512 may include multi-channel leveling amplifiers 518 that may be utilized to normalize the incoming audio channels, or to otherwise selectively boost or attenuate certain bus 542 signals. According to an example embodiment, the multi-channel leveling amplifier 518 may precede the input splitter/router module 516. According to an example embodiment, the multi-channel leveling amplifier 518 may be in parallel communication with any of the modules 520-528 and 540 via a parallel audio bus 542 and summing/mixing/routing nodes 544. According to an example embodiment, the audio microprocessor 512 may also include a multi-channel filter/crossover module 520 that may be utilized for selective equalization of the audio signals. According to an example embodiment, one function of the multi-channel filter/crossover module 520 may be to selectively alter the frequency content of certain audio channels so that, for example, only relatively mid and high frequency information is directed to the Top Center Front 118 and Top Center Rear 120 speakers, or so that only the low frequency content from all channels is directed to a subwoofer speaker.

With continued reference to FIG. 5, and according to an example embodiment, the audio microprocessor 512 may include a multi-channel delay module 522, which may receive signals from upstream modules 514-520, 540, in any combination via a parallel audio bus 542 and summing/mixing/routing nodes 544, or by the input splitter/router module 516. The multi-channel delay module 522 may be operable to impart a variable delay to the individual channels of audio that may ultimately be sent to the speakers. The multi-channel delay module 522 may also include a sub-module that may impart phase delays, for example, to selectively add constructive or destructive interference within the 3D-EA listening sphere or dome 312, or to adjust the size and position of the 3D-EA listening sphere or dome 312.

According to an example embodiment of the invention, the audio microprocessor 512 may further include a multi-channel pre-amp with rapid level control 524. This module 524 may be in parallel communication with all of the other modules in the audio microprocessor 512 via a parallel audio bus 542 and summing/mixing/routing nodes 544, and may be controlled, at least in part, by the encoded 3-D information, either present within the audio signal, or by the 3-D sound localization information that is decoded from the video feed via video microprocessor 538. An example function provided by the multi-channel pre-amp with rapid level control 524 may be to selectively adjust the volume of one or more channels so that the 3D-EA sound may appear to be directed from a particular direction. According to an example embodiment of the invention, a mixer 526 may perform the final combination of the upstream signals, and may perform the appropriate output routing for directing a particular channel. The mixer 526 may be followed by a multiple channel D/A converter 528 for reconverting all digital signals to analog before they are further routed. According to one example embodiment, the output signals from the D/A converter 528 may be optionally amplified by the tube pre-amps 546 and routed to transmitter 548 for sending to wireless speakers. According to another example embodiment, the output from the D/A converter 528 may be amplified by one or more combinations of (a) the tube pre-amps 546, (b) the multi-channel output amplifiers 530, or (c) the tube output stages 548 before being directed to the output terminals 532 for connecting to the speakers. According to an example embodiment of the invention, the multi-channel output amplifiers 530 and the tube output stages 548 may include protection devices to minimize any damage to speakers hooked to the output terminals 532, or to protect the multi-channel output amplifiers 530 and tube output stages 548 from damaged or shorted speakers, or shorted terminals 532.

According to an example embodiment, certain 3D-EA output audio signals can be routed to the output terminals 532 for further processing and/or computer interfacing. In certain instances, an output terminal 532 may include various types of home and/or professional quality outputs including, but not limited to, XLR, AESI, Optical, USB, Firewire, RCA, HDMI, quick-release or terminal locking speaker cable connectors, Neutrik Speakon connectors, etc.

According to example embodiments of the invention, speakers for use in the 3-D audio playback system may be calibrated or initialized for a particular listening environment as part of a setup procedure. The setup procedure may include the use of one or more calibration microphones 536. In an example embodiment of the invention, one or more calibration microphones 536 may be placed within about 10 cm of a listener position. In an example embodiment, calibration tones may be generated and directed through speakers, and detected with the one or more calibration microphones 536. In certain embodiments of the invention, the calibration tones may be generated, selectively directed through speakers, and detected. In certain embodiments, the calibration tones can include one or more of impulses, chirps, white noise, pink noise, tone warbling, modulated tones, phase shifted tones, multiple tones or audible prompts.

According to example embodiments, the calibration tones may be selectively routed individually or in combination to a plurality of speakers. According to example embodiments, the calibration tones may be amplified for driving the speakers. According to example embodiments of the invention, one or more parameters may be determined by selectively routing calibration tones through the plurality of speakers and detecting the calibration tones with the calibration microphone 536. For example, the parameters may include one or more of phase, delay, frequency response, impulse response, distance from the one or more calibration microphones, position with respect to the one or more calibration microphones, speaker axial angle, speaker radial angle, or speaker azimuth angle. In accordance with an example embodiment of the invention, one or more settings, including volume, equalization, and/or delay, may be modified in each of the speakers associated with the 3D-EA system based on the calibration or setup process. In accordance with embodiments of the invention, the modified settings or calibration parameters may be stored in memory 550. In accordance with an example embodiment of the invention, the calibration parameters may be retrieved from memory 550 and utilized to automatically initialize the speakers upon subsequent use of the system after initial setup.

Sound Localization

Figure 6:
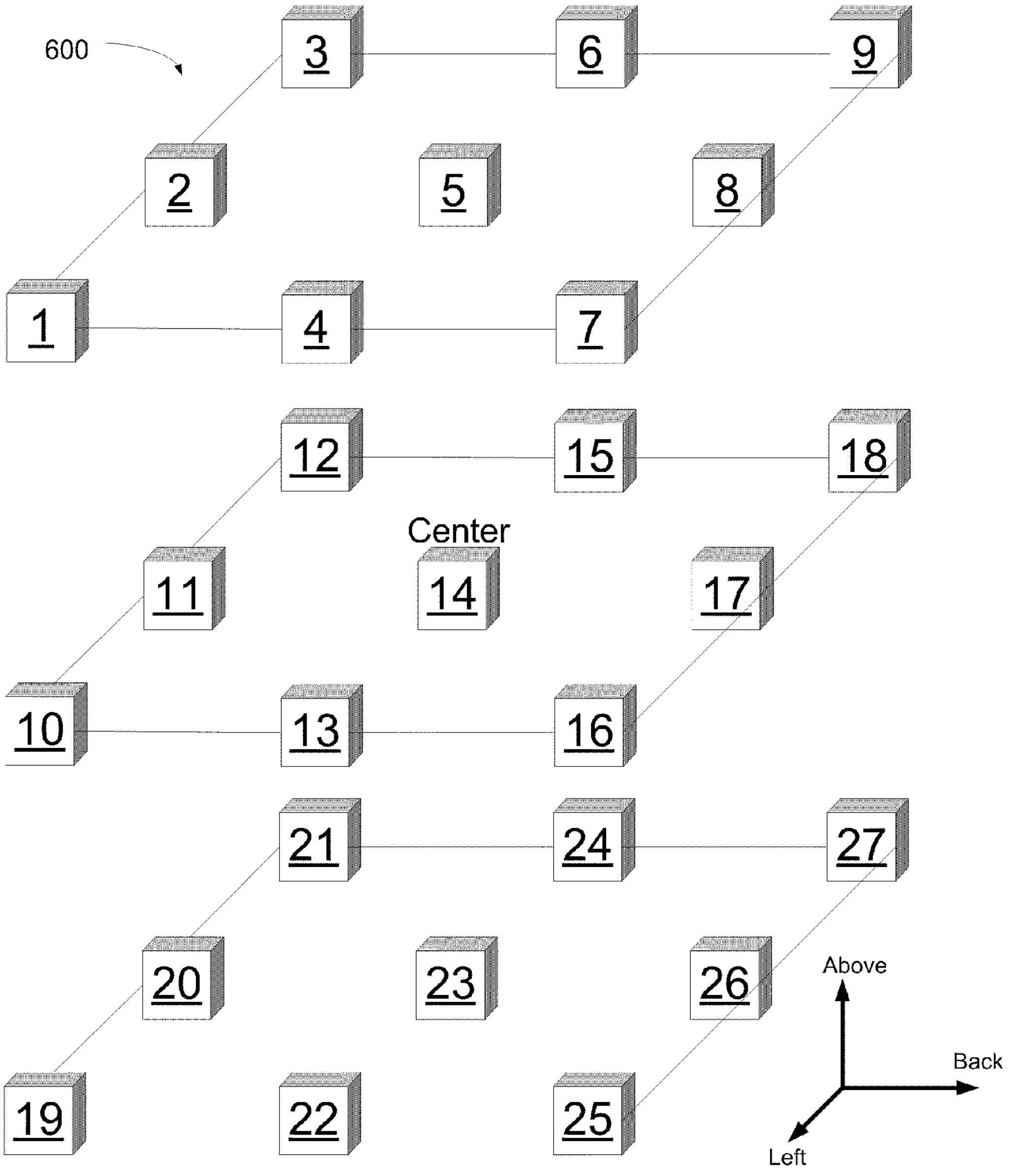
FIG. 6 illustrates an example 3D-EA sound localization map, in accordance with an example embodiment of the invention.

FIG. 6 depicts a 3D-EA sound localization map 600, according to an example embodiment of the invention. The 3D-EA sound localization map 600 may serve as an aid for describing, in space, the relative placement of the 3D-EA sound localizations relative to a central location. According to an example embodiment, the 3D-EA sound localization map 600 may include three vertical levels, each with 9 sub-regions, for a total of 27 sub-regions placed in three dimensions around the center sub-region 14. The top level may consist of sub-regions 1-9; the middle level may consist of sub-regions 10-18; and the bottom level may consist of sub-regions 19-27. An example orientation of a listening environment may place the center sub-region 14 at the head of the listener. The listener may face forward to look directly at the front center sub-region 11. According to other embodiments, the 3D-EA sound localization map may include more or less sub-regions, but for the purposes of defining general directions, vectors, localization, etc. of the sonic information, the 3D-EA sound localization map 600 may provide a convenient 3-D framework for the invention. As discussed in the preceding paragraphs, and in particular, with respect to FIG. 5, one aspect of the 3-D audio converter/amplifier 102 is to adjust, in real or near-real time, the parameters of the multiple audio channels so that all or part of the 3D-EA sound is dynamically localized to a particular region in three dimensional space. According to other example embodiments, the 3D-EA sound localization map 600 may include more or less sub-regions. According to another example embodiment, the 3D-EA sound localization map 600 may have a center offset vertically with respect to the center region shown in FIG. 6. The 3D-EA sound localization map 600 may be further explained and defined in terms of audio levels sent to each speaker to localize the 3D-EA sound at any one of the sub-regions 1-27 with the aid of FIG. 7.

According to an example embodiment of the invention, FIG. 7 depicts a example look-up table of relative sound volume levels (in decibels) that may be set for localizing the 3D-EA sound near any of the 27 sub-regions. The symbols "+", "–", "0", and "off" represent the relative signal levels for each speaker that will localize the 3D-EA sound to one of the 27 sub-regions, as shown in FIG. 6. According to an example embodiment of the invention, the "0" symbol may represent the default level for a particular speaker's volume, which may vary from speaker to speaker. For example, the Top Center Front 118 and Top Center Rear 120 speakers may have a default "0" level that is about 6 dB less than the default level "0" for the Left 110 speaker. According to an example embodiment of the invention, the "+" symbol may represent +6 dB, or approximately a doubling of the volume with respect to the default "0" signal level. The "−" symbol may represent about −6 dB, or approximately one half of the volume with respect to the default "0" level of the signal. The symbol "off" indicates that there should be no signal going to that particular speaker. In other example embodiments, the "+" symbol may represent a range of levels from approximately +1 to approximately +20 dB, depending on factors such as the size of the 3D-EA listening sphere or dome 312 needed in order to reproduce 3D-EA sounds for one or more listeners. Likewise, the "−" symbol may represent a range of levels from approximately −1 to approximately −20 dB. According to an example embodiment of the invention, the size of the 3D-EA listening sphere or dome 312 may be expanded or compressed by value of the signal level assigned to the "+" and "−" symbols.

In accordance with example embodiments of the invention, signals may be adjusted to control the apparent localization of sounds in a 3-dimensional listening environment. In an example embodiment, audio signals may be selectively processed by adjusting one or more of delay, equalization, and/or volume. In an example embodiment the audio signals may be selectively processed based on receiving decode data associated with the one or more audio channels. In accordance with an example embodiment, the decode data may include routing data for directing specific sounds to specific speakers, or to move sounds from one speaker (or set of speakers) to another to emulate movement. According to example embodiments, routing the one or more audio channels to one or more speakers may be based at least in part on the routing data. In certain embodiments, routing may include amplifying, duplicating and/or splitting one or more audio channels. In an example embodiment, routing may include directing the one or more audio channels to six or more processing channels. In certain embodiments, the audio may be processed for placing sounds in any one of five or more apparent locations in the 3-dimensional listening environment.

3-D Sound Recording Method

Figure 8:
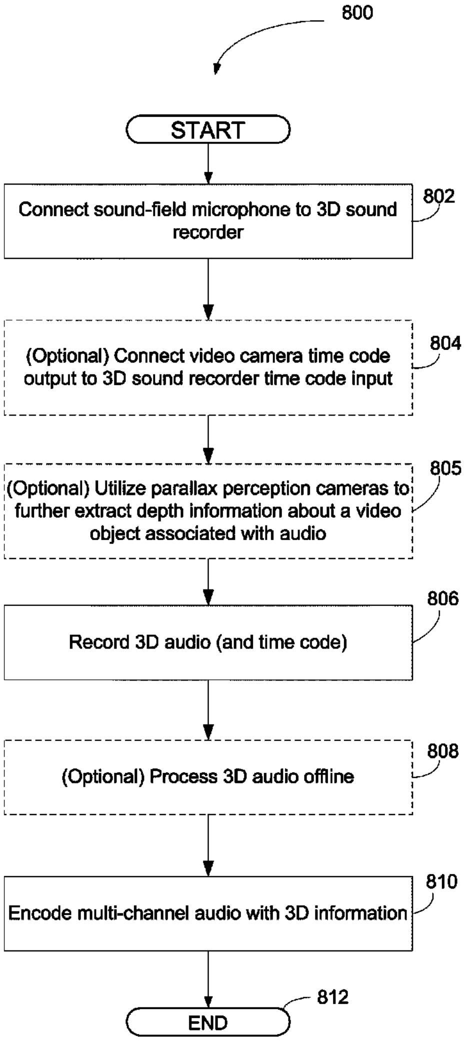
FIG. 8 illustrates an example method flow chart for recording and encoding 3-D audio and optional video time-code, in accordance with an example embodiment of the invention.

The method for recording 3-D audio, according to an example embodiment of the invention, will now be described with respect to FIG. 4 and the flowchart of FIG. 8. Method 800 begins in block 802 where a 3-D microphone 410 is connected to a multi-channel 3-D sound recorder 402. The 3-D microphone 410 may have multiple diaphragms or elements, each with a directional sensitivity that may selectively detect sonic information from a particular direction, depending on the orientation of the element. The directional receiving elements or diaphragms may comprise condenser elements, dynamic elements, crystal elements, piezoelectric elements, or the like. The diaphragms may have a cardioid, or super-cardioid sensitivity patterns, and may be oriented with respect to their nearest neighbors for partial overlap of their acceptance or sensitivity patterns. The 3-D microphone 410 may have three or more diaphragms for partial 3-D or whole sphere coverage. The 3-D microphone 410 may have an indicator or marking for proper directional orientation within a particular space.

Method 800 continues in optional block 804 where time code 408 from a video camera 406 (or other time code generating equipment) may be input to the 3-D sound recorder 402, recorded in a separate channel, and used for playback synchronization at a later time. Optionally, the 3-D sound recorder 402 may include an internal time code generator (not shown).

Method 800 continues in optional block 805 where parallax information from a stereo camera system 412 may be utilized for detecting the depth information of an object. The parallax information associated with the object may further be utilized for encoding the relative sonic spatial position, direction, and/or movement of the audio associated with the object.

The method continues in block 806 where the 3-D audio information (and the time code) may be recorded in a multichannel 3-D sound recorder 402. The multi-channel 3-D sound recorder 402 may include microphone pre-amps, automatic gain control (AGC), analog-to-digital converters, and digital storage, such as a hard drive or flash memory. The automatic gain control may be a linked AGC where the gain and attenuation of all channels can be adjusted based upon input from one of the microphone diaphragms. This type of linked AGC, or LAGC, may preserve the sonic spatial information, limit the loudest sounds to within the dynamic range of the recorder, and boost quiet sounds that may otherwise be inaudible.

Method 800 continues in block 808 with the processing of the recorded 3-D audio information. The processing of the 3-D audio information may be handled on-line, or optionally be transferred to an external computer or storage device 404 for off-line processing. According to an example embodiment of the invention, the processing of the 3-D audio information may include analysis of the audio signal to extract the directional information. As an illustrative example, suppose a 3-D recorder is being used to record a scene of two people talking next to road, with the microphone positioned between the road and the people. Presumably, all of the microphone channels will pick up the conversation However, the channels associated with the diaphragms closest to the people talking will likely have larger amplitude signal levels, and as such, may provide directional information for the conversation relative to the position of the microphone. Now, assume that a car travels down the street. As the car travels, the sound may be predominant in one channel associated with the microphone diaphragm pointed towards the car, but the predominant signal may move from channel to channel, again providing directional information for the position of the car with respect to time. According to an example embodiment of the invention, the multiple-diaphragm information, as described above, may be used to encode directional information in the multi-channel audio. Method 800 ends after block 810 where the processed 3-D information may be encoded into the multiple audio channels.

Another method for recording multi-dimensional audio is discussed with reference to FIG. 14 below.

According to one example embodiment of the invention, the signals recorded using the 3-D microphone 410 may be of sufficient quality, with adequate natural directionality that no further processing is required. However, according to another example embodiment, the 3-D microphone may have more or fewer diaphragms than the number of speakers in the intended playback system, and therefore, the audio channels may be mapped to channels corresponding with the intended speaker layout. Furthermore, in situations requiring conventional recording techniques using high quality specialized microphones, the 3-D microphone 410 may be utilized primarily for extracting 3D-EA sonic directional information. Such information may be used to encode directional information onto other channels that may have been recorded without the 3-D microphone 410. In some situations, the processing of the 3-D sound information may warrant manual input when sonic directionality can not be determined by the 3-D microphone 410 signals alone. Other situations are envisioned where it is desirable to encode directional information into the multi-channel audio based on the relative position of an object or person within a video frame. Therefore, the method of processing and encoding includes provisions for manual or automatic processing of the multi-channel audio.

According to certain embodiments of the invention, sounds emanating from different directions in a recording environment may be captured and recorded using a 3-D microphone having multiple receiving elements, where each receiving element may be oriented to preferentially capture sound coming predominately from a certain direction relative to the orientation of the 3-D microphone. According to example embodiments, the 3-D microphone may include three or more directional receiving elements, and each of the elements may be oriented to receive sound coming from a predetermined spatial direction. In accordance with embodiments of the invention, sounds selectively received by the directional receiving elements may be recorded in separate recording channels of a 3-D sound recorder.

According to an example embodiment, the 3-D sound recorder may record time code in at least one channel. In one embodiment, the time code may include SMTPE, or other industry standard formats. In another embodiment, the time code may include relative time stamp information that can allow synchronization with other devices. According to an example embodiment, time code may be recorded in at least one channel of the 3-D sound recorder, and the time code may be associated with at least one video camera.

According to example embodiments of the invention, the channels recorded by the 3-D sound recorder may be mapped or directed to output paths corresponding to a predetermined speaker layout. In certain embodiments, the recorded channels may be mapped or directed to output paths corresponding to six speakers. In certain example embodiments, recorded channels may be directed to output channels that correspond to the relative position of an object within a video frame.

Room and Speaker Setup/Calibration Method

Figure 9:
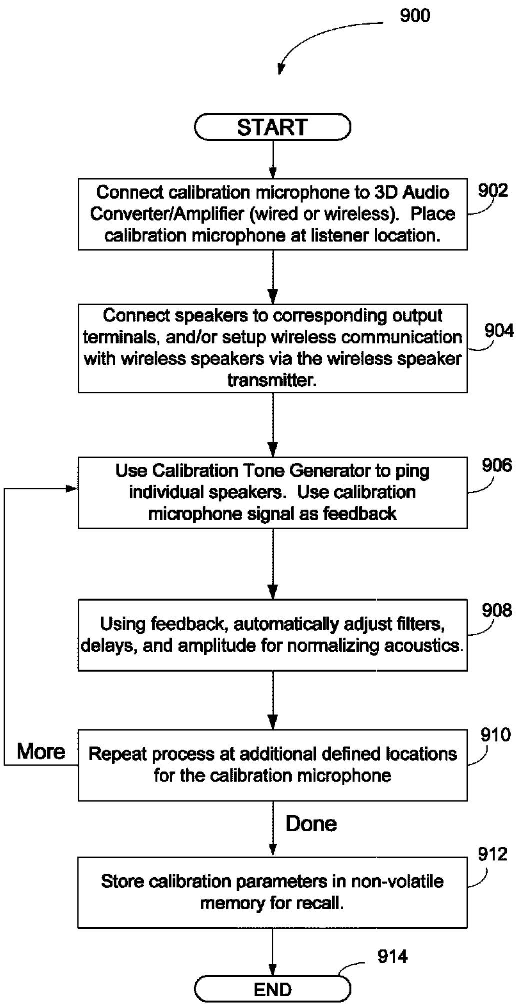
FIG. 9 illustrates an example method flow chart for calibrating speakers, in accordance with an example embodiment of the invention.

FIG. 9 depicts a method 900 for setting up and calibrating a 3-D audio system 100, according to an example embodiment of the invention. Beginning at block 902, the room calibration microphone 108 may be connected to the 3-D audio converter/amplifier 102, either wirelessly, or wired. According to an example embodiment of the invention, the room calibration microphone 108 may include one or more directionally sensitive diaphragms, and as such, may be similar or identical to the 3-D microphone 410 described above. The method continues in block 904 where the speakers 110-120 are connected to corresponding output terminals 532. Optionally, if one or more of the speakers are wireless, they can be in communication with the transmitter 548 for the wireless speakers. The setup mode of the 3-D audio converter/amplifier power may be entered manually, or automatically based upon the presence of the calibration microphone. The setup/calibration method continues in block 906 where, according to an example embodiment of the invention, the calibration microphone may measure the relative phase and amplitude of special tones generated by the calibration tone generator 540 within the 3-D audio converter/amplifier 102 and output through the speakers 110-120. The tones produced by the calibration tone generator 540 may include impulses, chirps, white noise, pink noise, tone warbling, modulated tones, phase shifted tones, and multiple tones, and may be generated in an automatic program where audible prompts may be given instructing the user to adjust the speaker placement or calibration microphone placement.

Method 900 continues in block 908 where according to an example embodiment of the invention, signals measured by the room calibration microphone 108 may be used as feedback for setting the parameters of the system 100, including filtering, delay, amplitude, and routing, etc., for normalizing the room and speaker acoustics. The method continues at block 910 where the calibration process can be looped back to block 906 to setup additional parameters, remaining speakers, or placement of the room calibration microphone 108. Looping through the calibration procedure may be accompanied by audible or visible prompts, for example "Move the calibration microphone approximately 2 feet to the left, then press enter." so that the system can properly set up the 3D-EA listening sphere or dome 312. Otherwise, if all of the calibration procedure has been completed, the method may continue to block 912 where the various calibration parameters calculated during the calibration process may be stored in non-volatile memory 550 for automatic recall and setup each time the system is subsequently powered-on so that calibration is necessary only when the system is first set up in a room, when the user desires to modify the diameter of the 3D-EA listening sphere or dome 312, or when other specialized parameters are set up in accordance with other embodiments of the invention. The method 900 ends after block 912.

An additional method for initializing and/or calibrating speakers associated with the 3D-EA system will be further described below with reference to FIG. 12.

Figure 10:
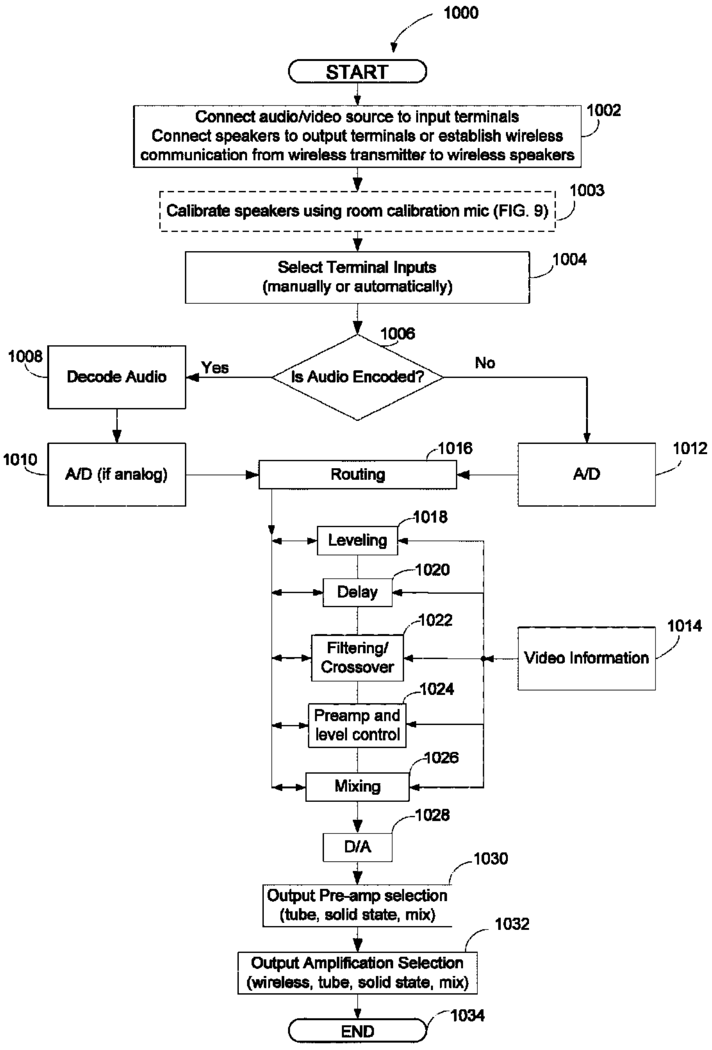
FIG. 10 illustrates an example method flow chart for converting, routing, and processing audio and video, in accordance with an example embodiment of the invention.

According to an example embodiment of the invention, a method 1000 is shown in FIG. 10 for utilizing the 3-D audio converter/amplifier for playback. Starting at block 1002, the input devices (audio source, video source) may be hooked to the input terminals of the 3-D audio converter/amplifier 102. Next, in block 1003, the system can be optionally calibrated, as was described above with reference to the flowchart of FIG. 9. For example, if the system was previously calibrated for the room, then the various pre-calculated parameters may be read from non-volatile memory 550, and calibration may not be necessary. The method 1000 continues in block 1004 where the input terminals are selected, either manually, or automatically by detecting the input on the terminals. The method 1000 may then continue to decision block 1006 where a determination can be made as to the decoding of the audio. If the terminal select decoder A/D module 514 detects that the selected input audio is encoded, it may decode the audio, as indicated in block 1008. According to an example embodiment, the decoding in block 1008 may, for example, involve splitting a serial data stream into several parallel channels for separate routing and processing. After decoding, the terminal select decoder A/D module 514module may also be used to convert analog signals to digital signals in block 1010 However, this A/D block may be bypassed if the decoded signals are already in digital format. If, in decision block 1006, the audio is determined to be generic analog stereo audio with no encoding, then the method may proceed to block 1012 where the analog signal may be converted to digital via a multi-channel A/D converter. According to an example embodiment, the method from either block 1010 or block 1012 may proceed to block 1016 where routing functions may be controlled by the input splitter/router module 516 in combination with the multi-channel bus 542 and the summing/mixing/routing nodes 544. According to multiple example embodiments of the invention, after block 1016, any number of unique combinations of routing and combining of the signals may be provided by the audio microprocessor 512. The routing and combining may involve processing the digital signals from any, all, or none of blocks 1018-1026. For example, the multiple channels of audio may all be routed through the multi-channel leveling amps 518 and the multi-channel pre-amps with rapid level control 524, but some of the channels may also be routed through the multi-channel filters/crossovers 520 and/or the multi-channel delay module 522. In other example embodiments, all channels may be routed through all of the modules 518-526 (corresponding to blocks 1018-1026 in FIG. 10), but only certain channels may be processed by the modules.

According to an example embodiment of the invention, block 1014 depicts video information that may be utilized for dynamic setting of the parameters in the corresponding blocks 1018-1026. For example, the video information in block 1014 may be utilized to interact with the pre-amp and level control in block 1024 (corresponding to the rapid level control 524 in FIG. 5) to rapidly adjust the relative volume levels of each channel to dynamically place certain sounds within a sub-region of the 3D-EA listening sphere or dome 312, as was discussed in relation with FIGS. 6 and 7. In another example embodiment, the video information in block 1014 may be utilized to interact with other blocks, such as the delay block 1020 and/or the filtering/crossover block 1022 to control the apparent location of a 3D-EA sound by imparting phasing or by adjusting the frequency content of a sound in certain speakers relative to the phasing or frequency content of the other speakers.

After processing the signals, the method 1000 continues to D/A block 1028 where the digital signals may be converted to analog before further routing. The method may continue to block 1030 where the analog signals can be pre-amplified by either a tube pre-amp, a solid state pre-amp, or a mix of solid state and tube pre-amps. According to one example embodiment, the output preamp of block 1030 may also be bypassed. The pre-amplified or bypassed signal may then continue to one or more paths as depicted in block 1032. In one example embodiment, the signals may be output and amplified by multi-channel output amplifiers 530 before being sent to the output terminals. According to an example embodiment, multi-channel output amplifiers 530 may include six or more power amplifiers. According to another example embodiment, the signals may be output amplified by tube output stages 548 before being routed to the output terminals. In yet another example embodiment, the signals may be sent to a multi-channel wireless transmitter 548 for transmitting to wireless speakers. In this embodiment, line-level signals can be sent to the wireless transmitter, and the warmth of the tube pre-amps 546 may still be utilized for the signals routed to separate amplifiers in the wireless speakers. According to another example embodiment, and with reference to block 1032, any combination of the output paths described above can be provided including wireless, tube output, solid state output, and mix of the wireless, tube, and solid state outputs. The method of FIG. 10 ends after block 1032, but it should be apparent that the method is dynamic and may continuously repeat, particularly from block 1016 to block 1028 as the system operates.

An additional method for controlling the apparent localization of sounds in a 3-dimensional listening environment will be further described below with reference to FIG. 13.

3-D Headphones

According to an example embodiment of the invention, the speakers or transducers utilized in the 3D-EA reproduction may be mounted within headphones, and may be in communication with the 3-D audio converter/amplifier 102 via one or more wired or wireless connections. According to an example embodiment of the invention, the 3-D headphones (not shown) may include at least one orientation sensor (accelerometer, gyroscope, weighted joystick, compass, etc.) to provide orientation information that can be used for additional dynamic routing of audio signals to the speakers within the 3-D headphones. According to an example embodiment, the dynamic routing based on the 3-D headphone orientation may be processed via the 3-D audio converter/amplifier 102. According to another example embodiment, the dynamic routing based on the 3-D headphone orientation may be processed via additional circuitry, which may include circuitry residing entirely within the headphones, or may include a separate processing box for interfacing with the 3-D audio converter/amplifier 102, or for interfacing with other audio sources. Such dynamic routing can simulate a virtual listening environment where the relative direction of 3D-EA sounds can be based upon, and may correspond with, the movement and orientation of the listener's head.

Figure 11:
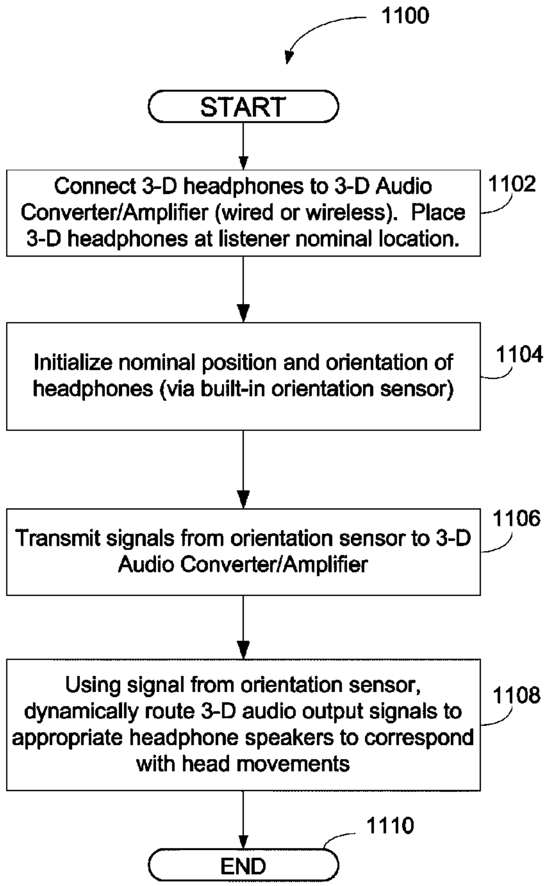
FIG. 11 illustrates an example method flow chart for utilizing 3-D headphones, in accordance with an example embodiment of the invention.

An example method 1100 for providing dynamic 3D-EA signal routing to 3-D headphones based on the listener's relative orientation is described in FIG. 11. The method begins in block 1102 where the 3-D headphones may be connected to the 3-D audio converter/amplifier 102 via one or more wired or wireless connections. For example, the wireless connections for transmitting orientation information to the 3-D audio converter/amplifier 102 may include the wireless link associated with the remote control or the calibration mic 536, as shown in FIG. 5. The wireless information for transmitting audio signals from the 3-D audio converter/amplifier 102 to the 3-D headphones may include the transmitter 548 for wireless speakers. According to another embodiment, a multi-conductor output jack may be included in the output terminals 532 to provide amplified audio to the headphones so that separate amplifiers may not be required.

The method continues in block 1104 where, according to an example embodiment of the invention, the nominal position of the orientation sensor may be established so that, for example, any rotation of the head with respect to the nominal position may result in a corresponding rotation of the 3D-EA sound field produced by the 3-D headphones. In an example embodiment, the listener may establish the nominal position by either pressing a button on the 3-D headphones, or by pressing a button on the remote control associated with the 3-D audio converter/amplifier 102 to establish the baseline nominal orientation. In either example case, the 3-D headphone processor (either in the 3-D audio converter/amplifier 102, in the 3-D headphones themselves, or in an external processor box) may take an initial reading of the orientation sensor signal when the button is pressed, and may use the initial reading for subtracting, or otherwise, differentiating subsequent orientation signals from the initial reading to control the 3D-EA sound field orientation.

The method continues in block 1106 where, according to an example embodiment, signals from the one or more orientation sensors may be transmitted to the 3-D audio converter/amplifier 102 for processing the 3D-EA sound field orientation. As described above, the signal from the orientation sensor may reach the 3-D audio converter/amplifier 102 via a wired or wireless connection. According to another example embodiment, the signals from the one or more orientation sensors may be in communication with the 3-D headphone processor, and such a processor may reside within the 3-D audio converter/amplifier 102, within the 3D headphones, or within a separate processing box.

The method continues in block 1108 where, according to an example embodiment of the invention, the signals from the one or more orientation sensors may be used to dynamically control and route the 3-D audio output signals to the appropriate headphone speakers to correspond with head movements. The method ends after block 1108.

It should be apparent from the foregoing descriptions that all of the additional routing and processing of the signals for the 3-D headphones may be done in addition to the routing and processing of the audio signals for placement of 3D-EA sounds within a 3D-EA listening sphere or dome 312. For example, a sound coming from the direct left, which may be region 13 as shown in FIG. 6, may be rotated to the right to the position of region 11 as the listener's head rotates 90 degrees to the left about the vertical axis. Therefore, in an example embodiment, the 3D-EA sound field within the headphones may rotate in a direction opposing the rotation of the listener's head.

Remote Operations

According to example embodiments of the invention, the 3-D audio converter/amplifier 102 may include one or more remote control receivers, transmitters, and/or transceivers for communicating wirelessly with one or more remote controls, one or more wireless microphones, and one or more wireless or remote speakers or speaker receiver and amplification modules. In an example embodiment, the wireless or remote speaker receiver and amplification modules can receive 3D-EA signals from a wireless transmitter 548, which may include capabilities for radio frequency transmission, such as Bluetooth. In another example embodiment, the wireless transmitter 548 may include infrared (optical) transmission capabilities for communication with a wireless speaker or module. In yet another example embodiment, the power supply 502 may include a transmitter, such as an X10 module 552, in communication with the output D/A converter 528 or the tube pre-amp 546, for utilizing existing power wiring in the room or facility for sending audio signals to remote speakers, which may have a corresponding X10 receiver and amplifier.

In an example embodiment, a wireless or wired remote control may be in communication with the 3-D audio converter/amplifier 102. In an example embodiment, a wireless or wired remote control may communicate with the 3-D audio converter/amplifier 102 to, for example, set up speaker calibrations, adjust volumes, set up the equalization of the 3D-EA sound in the room, select audio sources, or select playback modes. In another example embodiment, the wireless or wired remote control may communicate with the 3-D audio converter/amplifier 102 to set up a room expander feature, or to adjust the size of the 3D-EA listening sphere or dome 312. In another example embodiment, the wireless or wired remote control may comprise one or more microphones for setting speaker calibrations.

Additional Method Embodiments

Figure 12:
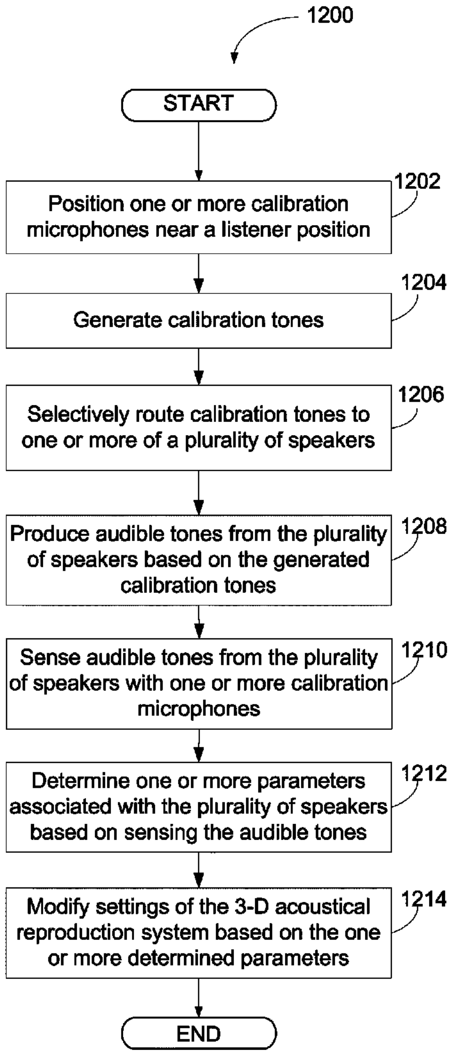
FIG. 12 illustrates another example method flow chart for initializing and/or calibrating speakers, in accordance with an example embodiment of the invention.

Another example method 1200 for initializing or calibrating a plurality of speakers in a 3-D acoustical reproduction system is described in FIG. 12. According to an example embodiment of the invention, the method 1200 starts in block 1202 and includes positioning one or more calibration microphones near a listener position. In block 1204, the method includes generating calibration tones. In block 1206, the method includes selectively routing calibration tones to one or more of the plurality of speakers. The method continues in block 1208 where it includes producing audible tones from the plurality of speakers based on the generated calibration tones. In block 1210, the method includes sensing audible tones from the plurality of speakers with the one or more calibration microphones. In block 1212, the method includes determining one or more parameters associated with the plurality of speakers based on sensing the audible tones. In block 1214, the method includes modifying settings of the 3-D acoustical reproduction system based on the one or more determined parameters. Method 1200 ends after block 1214.

Figure 13:
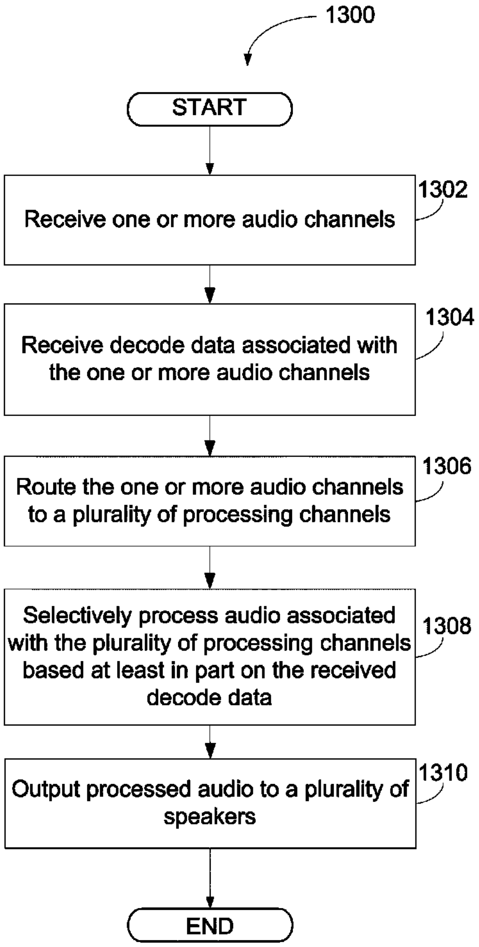
FIG. 13 illustrates an example method flow chart for controlling the placement of sounds in a three-dimensional listening environment, in accordance with an example embodiment of the invention.

An example method 1300 for controlling the apparent location of sounds in a 3-dimensional listening environment is described in FIG. 13. According to an example embodiment of the invention, the method 1300 starts in block 1302 and includes receiving one or more audio channels. In block 1304, the method includes receiving decode data associated with the one or more audio channels. In block 1306, the method includes routing the one or more audio channels to a plurality of processing channels. In block 1308, the method includes selectively processing audio associated with the plurality of processing channels based at least in part on the received decode data. In block 1310, the method includes outputting processed audio to a plurality of speakers. The method 1300 ends after block 1310.

Figure 14:
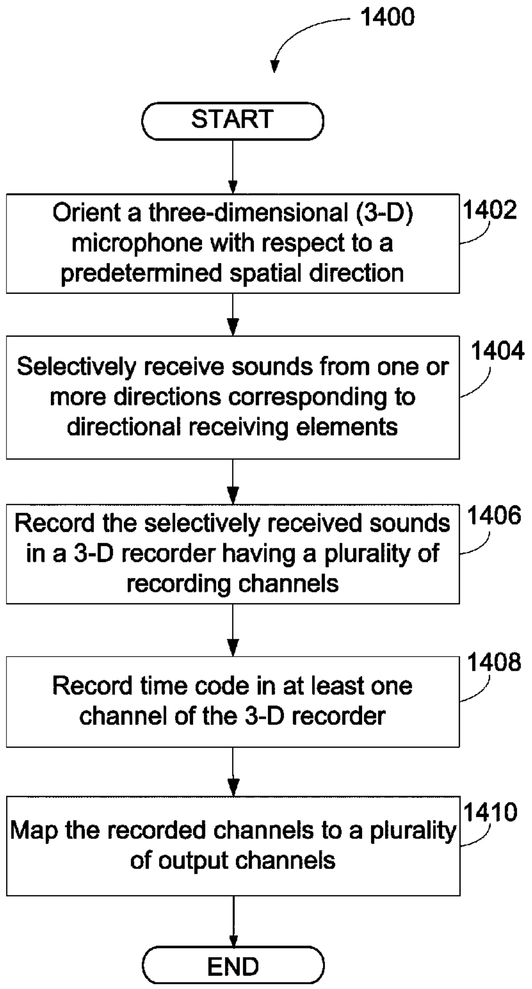
FIG. 14 illustrates another example method flow chart for recording multi-dimensional audio, in accordance with an example embodiment of the invention.

An example method 1400 for recording multi-dimensional audio is described in FIG. 14. The method 1400 begins in block 1402 and may include orienting a three-dimensional (3-D) microphone with respect to a predetermined spatial direction. In block 1404, the method includes selectively receiving sounds from one or more directions corresponding to directional receiving elements. In block 1406, the method includes recording the selectively received sounds in a 3-D recorder having a plurality of recording channels. In block 1408, the method includes recording time code in at least one channel of the 3-D recorder. And in block 1410, the method includes mapping the recorded channels to a plurality of output channels. The method ends after block 1410.

The configuration and arrangement of the modules shown and described with respect to the accompanying figures are shown by way of example only, and other configurations and arrangements of system modules can exist in accordance with other embodiments of the invention.

According to an example embodiment, the invention may be designed specifically for computer gaming and home use. According to another example embodiment, the invention may be designed for professional audio applications, such as in theaters and concert halls.

Embodiments of the invention can provide various technical effects which may be beneficial for listeners and others. In one aspect of an embodiment of the invention, example systems and methods, when calibrated correctly, may sound about twice as loud (+6 dB) as stereo and/or surround sound yet may only be approximately one sixth (+1 dB) louder.

In another aspect of an embodiment of the invention, example systems and methods may provide less penetration of walls, floors, and ceilings compared to conventional stereo or surround sound even though they may be approximately one-sixth louder. In this manner, an improved sound system can be provided for apartments, hotels, condos, multiplex theaters, and homes where people outside of the listening environment may want to enjoy relative quiet.

In another aspect of an embodiment of the invention, example systems and methods can operate with standard conventional sound formats from stereo to surround sound.

In another aspect of an embodiment of the invention, example systems and methods can operate with a variety of conventional sound sources including, but not limited to, radio, television, cable, satellite radio, digital radio, CDs, DVDs, DVRs, video games, cassettes, records, Blue Ray, etc.

In another aspect of an embodiment of the invention, example systems and methods may alter the phase to create a sense of 3-D movement.

The methods disclosed herein are by way of example only, and other methods in accordance with embodiments of the invention can include other elements or steps, including fewer or greater numbers of element or steps than the example methods described herein as well as various combinations of these or other elements.

While the above description contains many specifics, these specifics should not be construed as limitations on the scope of the invention, but merely as exemplifications of the disclosed embodiments. Those skilled in the art will envision many other possible variations that are within the scope of the invention.

The invention is described above with reference to block and flow diagrams of systems, methods, apparatuses, and/or computer program products according to example embodiments of the invention. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the invention.

These computer-executable program instructions may be loaded onto a general purpose computer, a special-purpose computer, a processor, or other programmable data processing apparatus to produce a particular machine, such that the instructions that execute on the computer, processor, or other programmable data processing apparatus create means for implementing one or more functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the invention may provide for a computer program product, comprising a computer usable medium having a computer readable program code or program instructions embodied therein, said computer readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special purpose hardware and computer instructions.

In certain embodiments, performing the specified functions, elements or steps can transform an article into another state or thing. For instance, example embodiments of the invention can provide certain systems and methods that transform encoded audio electronic signals into time-varying sound pressure levels. Example embodiments of the invention can provide the further systems and methods that transform positional information to directional audio.

Many modifications and other embodiments of the invention set forth herein will be apparent having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The claimed invention is:

1. A method for recording multi-dimensional audio, the method comprising:

orienting a three-dimensional (3-D) microphone with respect to a predetermined spatial direction;

selectively receiving sounds from one or more directions corresponding to directional receiving elements;

recording the selectively received sounds in a 3-D recorder having a plurality of recording channels;

recording time code in at least one channel of the 3-D recorder; and mapping the recorded channels to a plurality of output channels, wherein the mapping comprises defining a plurality of sub-regions oriented on at least three vertical levels, each of the vertical levels comprising a substantially horizontal plane in a listening environment, and sounds are customized for each of the sub-regions.

2. The method of claim 1, wherein recording the selectively received sounds comprises recording signals from each of the directional receiving element in separate recording channels.

3. The method of claim 1, wherein orienting the 3-D microphone comprises orienting three or more directional receiving elements with respect to a predetermined spatial direction.

4. The method of claim 1, wherein recording time code in at least one channel of the 3-D recorder comprises recording time code associated with at least one video camera.

5. The method of claim 1, wherein mapping the recorded channels comprises directing recorded channels to output paths corresponding to a predetermined speaker layout.

6. The method of claim 1, wherein mapping the recorded channels comprises directing recorded channels to output paths corresponding to six speakers.

7. The method of claim 1, wherein mapping the recorded channels comprises directing recorded channels to output channels corresponding to a relative position of an object within a video frame.

8. A system for recording multi-dimensional audio and video, the system comprising:

at least one video camera;

a three-dimensional (3-D) microphone comprising a plurality of directional receiving elements, the 3-D microphone oriented with respect to a predetermined spatial direction associated with the video camera;

a 3-D recorder configured to selectively receive sound information from the 3-D microphone, and further configured to:

record the selectively received sound information in channels corresponding to the plurality of directional receiving elements;

record time code; and map the recorded channels to a plurality of output channels, wherein a plurality of sub-regions is defined oriented on at least three vertical levels, each of the vertical levels comprising a substantially horizontal plane in a listening environment, and sound information is customized for each of the sub-regions.

9. The system of claim 8, wherein the 3-D microphone comprises four or more directional receiving elements.

10. The system of claim 8, wherein the 3-D recorder is further configured to record time code associated with the at least one video camera.

11. The system of claim 8, wherein the 3-D recorder is further configured to direct recorded channels to output paths corresponding to a predetermined speaker layout.

12. The system of claim 8, wherein the 3-D recorder is further configured to direct recorded channels to output paths corresponding to six speakers.

13. The system of claim 8, wherein the 3-D recorder is further configured to direct recorded channels to output channels corresponding to a relative position of an object within a video frame associated with the at least one video camera.

14. The system of claim 8, comprising two video cameras, wherein the two video cameras are operable to provide parallax information for mapping the recorded channels to a plurality of output channels.

15. An apparatus for recording multi-dimensional audio, the apparatus comprising:

a three-dimensional (3-D) microphone comprising a plurality of directional receiving elements, the 3-D microphone oriented with respect to a predetermined spatial direction;

a 3-D recorder configured to selectively receive sound information from the 3-D microphone, and further configured to:

record the selectively received sound information in channels corresponding to the plurality of directional receiving elements;

record time code; and map the recorded channels to a plurality of output channels, wherein a plurality of sub-regions is defined oriented on at least three vertical levels, each of the vertical levels comprising a substantially horizontal plane in a listening environment, and sound information is customized for each of the sub-regions.

16. The apparatus of claim 15, wherein the 3-D microphone comprises four or more directional receiving elements.

17. The apparatus of claim 15, wherein the 3-D recorder is further configured to record time code associated with at least one video camera.

18. The apparatus of claim 15, wherein the 3-D recorder is further configured to direct recorded channels to output paths corresponding to a predetermined speaker layout.

19. The apparatus of claim 15, wherein the 3-D recorder is further configured to direct recorded channels to output paths corresponding to six speakers.

20. The apparatus of claim 15, wherein the 3-D recorder is further configured to direct recorded channels to output channels corresponding to a relative position of an object within a video frame.

* * * * *